Jan. 7, 1947. D. SAMIRAN 2,413,730
SAFETY HOSE COUPLING
Original Filed May 13, 1943
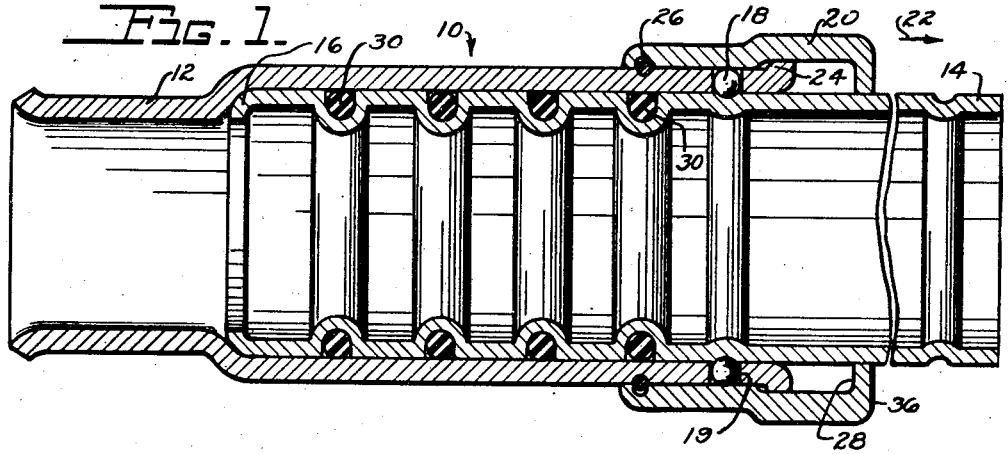
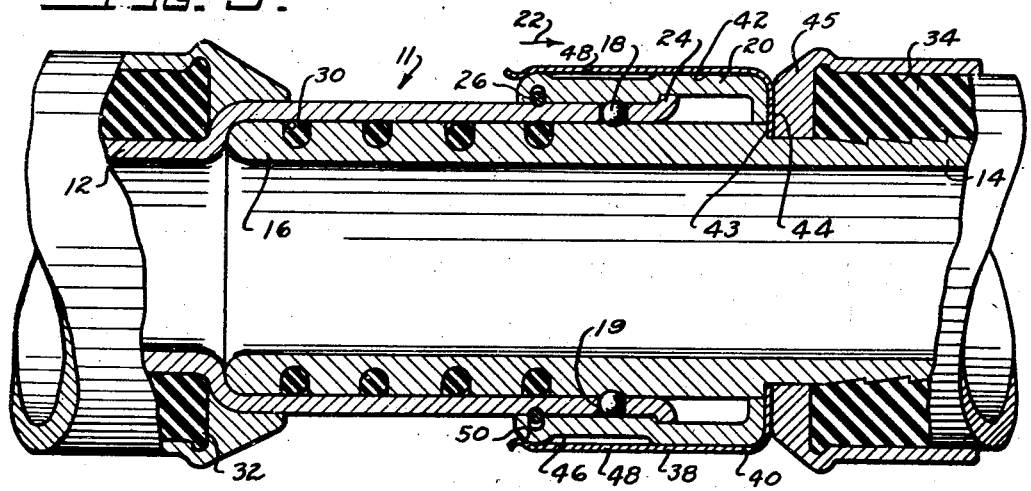
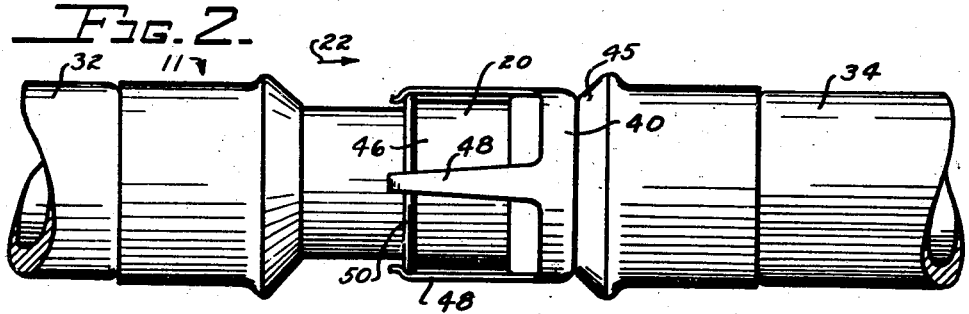
INVENTOR.
DAVID SAMIRAN
BY
ATTORNEYS Patented Jan. 7, 1947

2,413,730

UNITED STATES PATENT OFFICE.

2,413,730

SAFETY HOSE COUPLING

David Samiran, Osborn, Ohio

Original application May 13, 1943, Serial No. 486,832. Divided and this application December 19, 1944, Serial No. 568,915

2 Claims. (Cl. 285—168)

(Granted under the act of March 3, 1883, as amended April 30, 1928; 370 O. G. 757)

The invention described herein may be manufactured and used by or for the Government for governmental purposes, without the payment to me of any royalty thereon.

This invention is a division of my copending application Serial No. 486,832, filed May 13, 1943, which matured into Patent 2,386,270, of October 9, 1945, and relates to a fluid pressure hose coupling having particular reference to a device for connecting two parts of a pressure hose.

An object of the invention is to provide a device of this character whereby the two parts of a pressure hose may be effectively connected with minimum time and with minimum effort.

Another object of the invention is to provide a safety means which will guard the coupling against accidental uncoupling. Other objects will be apparent upon consideration of the following description taken in conjunction with the drawing, wherein:

Fig. 1 shows the coupling as it would appear without the safety feature.

Fig. 2 is a plan view of another modification of the invention in which the safety device is added.

Fig. 3 is a longitudinal axial section taken at 3—3 of Fig. 2 showing the safety device in greater detail.

The coupling shown in Fig. 1, which may be broadly designated by the numeral 10, may be advantageously used in a situation where a large inside capacity is necessary and the space or weight factor is limited. It comprises a body 12 and a sleeve 14 which is axially slidable into the body until it encounters the shoulder 16.

A series of detents 18 in a circular row of pockets 19 in the body are nested in an annular groove in the sleeve 14 to hold the sleeve in position. A locking collar 20 surrounds the body 12 and is movable in the direction of the arrow 22, to the position shown, to lock the detents in place. A shoulder 24 limits movement of the locking collar 20 and a spring ring 26 is adapted to enter a groove in the exterior surface of the body 12 to hold the locking collar against axial movement. A shoulder 28 limits movement of the locking collar 20 in the direction opposite the arrow 22. Synthetic rubber seal rings 30 are spaced along the sleeve 14 to seal against leakage.

It is noted that the spring ring 26 acts as a yieldable retainer detent to hold the locking collar 20 in the locked position with respect to body 12 as shown. The spring ring 26 is a single turn open ring of spring wire made to substantially encircle the groove in the body 12 and grip it with a light pressure. This pressure must be overcome before the collar 20 may be moved oppositely of the arrow 22 to the unlocked position.

After the retainer 26 is forced out of the groove over the larger diameter of the body adjacent the groove, it moves easily until the retainer engages the end of the sleeve. This retaining mechanism is adapted to yieldingly hold two telescopic thin-walled tubes against axial movement with respect to each other.

The modification shown in Figs. 2 and 3 has all the elements of that shown in Fig. 1, with the addition of a safety device which will prevent accidental unlocking of the two parts of the coupling. Unlocking of the coupling 10, Fig. 1 is as before stated, accomplished by pushing the locking collar 20 axially from the position shown in the drawing against the resistance of the retainer 26. The retainer 26, which maintains the locked position shown, may therefore be no stronger than may conveniently be overcome with the fingers.

When, however, a coupling of this type is used to join two lengths of hose such as appear at 32 and 34, Figs. 2 and 3, the coupling as shown at 10, Fig. 1, may, without more, be inadequate, particularly if the use is such that the lengths of hose and coupling are dragged on the ground, for, in that case, if the hose is dragged in the direction of the arrow 22, the shoulder 36, (see Fig. 1) may catch on a stone or other obstruction, and the locking collar 20 be thereby moved and the coupling thereby become unlocked. The safety element 40, Figs. 2 and 3, is added to obviate the possibility of this contingency.

The coupling assembly 10 of Fig. 1, when it has added thereto the safety element in the form of a cage 40 of Figs. 2 and 3 may be broadly designated by the numeral 11. The cage 40 on coupling 11 consists of a cup-shaped part which may preferably be slidably fitted at 42 to the locking collar 20 and flanged inward at the end of the locking collar as at 44, the inner edge of the flange being held between a shoulder 43 on the sleeve 14 and a ferrule 45 which is shrunk over the outside of the hose. The open end of the cage 40 is partly cut away at intervals as at 46, the remaining portions being otherwise so fabricated as to provide a series of leaf springs 48.

The front end of the locking collar 20 has a bead 50 encircling it, and the leaf springs 48 are formed so as to snap over this bead. Obviously dragging the hose cannot shift the locking collar 20 axially to the unlocked position because of the way in which it is covered by the safety cage 40, yet collar 20 may be shifted easily by gripping it by thumb and finger in the spaces 46 between the leaf springs 48 and pushing it forward against the slight resistance of the leaf springs, and, of course, against the retainer 26.

Having described my invention, I claim:

1. In a hose coupling which comprises a body, a sleeve axially slidable in said body, a detent carried by said body adapted to engage said sleeve and prevent axial movement between said body and sleeve, and a locking collar slidable axially on said body for operating said detent into engagement with said sleeve, the improvement which consists of a safety element in the form of a cage surrounding and enclosing the locking collar, said cage being axially immovable with respect to the sleeve and having access openings through its sides to said locking collar, whereby thumb and finger pressure may be applied to said locking collar to move it axially within said cage.

2. In a hose coupling which comprises a body, a sleeve axially slidable in said body, a detent carried by said body adapted to engage said sleeve and prevent axial movement between said body and said sleeve, and a locking collar slidable axially on said body for operating said detent into engagement with said sleeve, the improvement which consists of a safety element in the form of a cage, said cage having one end flanged inward and joined to the sleeve to prevent axial movement between said cage and said sleeve, and the other end provided with circumferentially spaced axially extending leaf springs tensioned to bear on said locking collar to yieldably resist axial movement of said locking collar in said cage.

DAVID SAMIRAN.